United States Patent
Santisteban

(10) Patent No.: US 9,739,589 B2
(45) Date of Patent: Aug. 22, 2017

(54) VEHICLE WHEEL ALIGNMENT DEVICE

(71) Applicant: Juan Carlos Santisteban, San Jose (CR)

(72) Inventor: Juan Carlos Santisteban, San Jose (CR)

(*) Notice: Subject to any disclaimer, the term of this patent is extended or adjusted under 35 U.S.C. 154(b) by 0 days.

(21) Appl. No.: 14/697,319

(22) Filed: Apr. 27, 2015

(65) Prior Publication Data

US 2016/0313110 A1    Oct. 27, 2016

(51) Int. Cl.
  *G01B 5/255* (2006.01)
  *G01B 3/20* (2006.01)

(52) U.S. Cl.
  CPC .............. *G01B 5/255* (2013.01); *G01B 3/205* (2013.01); *G01B 2210/16* (2013.01)

(58) Field of Classification Search
  CPC ..................................................... G01B 5/255
  USPC ..................................................... 33/203.18
  See application file for complete search history.

(56) References Cited

U.S. PATENT DOCUMENTS

| | | | | |
|---|---|---|---|---|
| 1,399,228 | A | * | 12/1921 | Rowe ..................... G01B 5/255 33/203.17 |
| 1,822,983 | A | * | 9/1931 | Vanica .................... G01B 5/255 33/203.21 |
| 2,006,013 | A | * | 6/1935 | Claywell ................ G01B 5/255 33/203.2 |
| 2,036,895 | A | | 4/1936 | Tharp |
| 2,235,321 | A | * | 3/1941 | Krumm .................. G01B 5/255 33/335 |
| 2,502,039 | A | | 3/1950 | Floyd, Jr. |
| 2,556,227 | A | | 6/1951 | Shaw |
| 2,616,186 | A | | 11/1952 | Shooter et al. |
| 2,618,072 | A | * | 11/1952 | Krumm .................. G01B 5/255 33/203.17 |
| 2,704,894 | A | * | 3/1955 | Rogers ................... G01B 5/255 33/203 |
| 3,164,910 | A | | 1/1965 | Manlove |
| 3,181,248 | A | | 5/1965 | Manlove |
| 3,182,405 | A | | 5/1965 | Taylor |
| 3,426,438 | A | | 2/1969 | Wilkerson |

(Continued)

FOREIGN PATENT DOCUMENTS

CA    1 073 664 A    3/1980
CA    1 127 834        7/1982

(Continued)

OTHER PUBLICATIONS

International Search Report and Written Opinion mailed Aug. 5, 2016, directed to International Application No. PCT/IB2016/052387; 12 pages.

(Continued)

*Primary Examiner* — Christopher Fulton
(74) *Attorney, Agent, or Firm* — Morrison & Foerster LLP

(57) ABSTRACT

A wheel alignment apparatus for measuring the toe angle of a wheel of a vehicle including an adjustable housing, a scale slider including one or more measurement scales, and a centering marker, and a toe positioning pin projecting from an end of the adjustable housing, the toe positioning pin configured to be rigidly connected to the adjustable housing during operation of the wheel alignment apparatus, wherein the scale slider is adjustable to a plurality of positions within the housing.

23 Claims, 5 Drawing Sheets

(56) References Cited

U.S. PATENT DOCUMENTS

| | | | |
|---|---|---|---|
| 3,445,936 A | 5/1969 | Wilkerson | |
| 3,760,507 A * | 9/1973 | LaRocca | G01B 5/255 |
| | | | 33/203.17 |
| 3,805,399 A | 4/1974 | Price | |
| 3,869,798 A | 3/1975 | Wilkerson | |
| 4,115,926 A | 9/1978 | Hampton, Jr. et al. | |
| 4,143,970 A | 3/1979 | Lill | |
| 4,157,618 A * | 6/1979 | Davis | G01B 5/255 |
| | | | 33/203.15 |
| 4,200,988 A | 5/1980 | Hunter | |
| 4,338,027 A * | 7/1982 | Eck | G01B 11/26 |
| | | | 33/203.12 |
| 4,341,021 A | 7/1982 | Beissbarth | |
| 4,383,370 A | 5/1983 | Van Blerk et al. | |
| 4,402,603 A | 9/1983 | Lill | |
| 4,408,399 A | 10/1983 | Darwood et al. | |
| 4,457,075 A * | 7/1984 | Murata | G01B 7/315 |
| | | | 33/203.15 |
| 4,481,716 A | 11/1984 | Beissbarth | |
| 4,510,694 A | 4/1985 | Boyce | |
| 4,523,844 A | 6/1985 | Titsworth et al. | |
| 4,569,140 A | 2/1986 | Hobson | |
| 4,615,618 A | 10/1986 | Bailey et al. | |
| 4,679,327 A | 7/1987 | Fouchey et al. | |
| 4,803,785 A | 2/1989 | Reilly | |
| 4,942,666 A | 7/1990 | Wickmann et al. | |
| 4,942,667 A | 7/1990 | Fournier | |
| 4,967,480 A | 11/1990 | DeLuca | |
| 5,020,231 A | 6/1991 | Huynh | |
| 5,033,198 A | 7/1991 | Hastings | |
| 5,111,586 A | 5/1992 | Huynh | |
| 5,168,632 A | 12/1992 | Rimlinger, Jr. | |
| 5,471,754 A * | 12/1995 | Mieling | G01B 5/255 |
| | | | 33/203.18 |
| 5,549,319 A | 8/1996 | Kring | |
| 5,553,389 A | 9/1996 | Winslow et al. | |
| 5,797,190 A | 8/1998 | Matson | |
| 5,842,281 A * | 12/1998 | Mieling | G01B 5/255 |
| | | | 33/203.18 |
| 6,219,134 B1 | 4/2001 | Voeller et al. | |
| 6,510,615 B1 | 1/2003 | Budd | |
| 6,522,400 B1 | 2/2003 | Horn | |
| 6,745,483 B2 | 6/2004 | Ariganello et al. | |
| 7,415,771 B2 | 8/2008 | Harrill | |
| 7,661,198 B2 | 2/2010 | Hara | |
| 2011/0179656 A1 | 7/2011 | Rogers | |
| 2012/0110867 A1* | 5/2012 | Molina | G01B 3/205 |
| | | | 33/608 |

FOREIGN PATENT DOCUMENTS

| | | |
|---|---|---|
| CA | 2129721 | 3/1995 |
| CA | 2 259 485 | 11/1998 |
| CA | 2 397 167 | 11/2001 |
| DE | 3210318 | 9/1983 |
| DE | 3402738 | 8/1984 |
| DE | 3426506 | 1/1985 |
| DE | 3446358 | 8/1985 |
| DE | 3516037 | 11/1986 |
| EP | 0 880 009 | 11/1998 |
| WO | WO-92/03696 | 3/1992 |

OTHER PUBLICATIONS

Team Bear USA. (2015) "Toe Gauge, Chain—Std. Cars & Light Trucks," located at http://www.teambearusa.com/modules/store/Toe-Gauge-Chain-Std-Cars-Light-Trucks P6 . . . visited on Apr. 27, 2015; 2 pages.

* cited by examiner

VEHICLE WHEEL ALIGNMENT DEVICE

FIELD OF THE INVENTION

The invention relates to devices and methods for measuring and adjusting toe, which is the angle formed between the rotational plane of a wheel of a vehicle to the central vertical plane of the chassis of a vehicle. Measurements using the device are taken in reference to an external reference marker such as a parallel string to determine toe measurements.

BACKGROUND OF THE INVENTION

When preparing a car for racing, it is often not desirable to have the front wheels exactly parallel to each other. The wheels often must be aligned by adjusting the angles of the wheels to achieve optimal handling. Toe is a measurement that determines how much the front and/or rear wheels are turned in or out from a straight-ahead position. Toe-in is a condition that occurs when a wheel is aligned such its leading edge is angled toward the vehicle's chassis centerline. Toe-out occurs when the leading edge of the wheel angles away from the chassis centerline. The amount of toe is typically given as the difference between a measurement of the distance from a tire to a reference marker at the leading edge of the tire and a measurement of the distance from the tire to a reference marker at the trailing edge of the tire, although it can also be given as the angle in which a wheel is out of parallel. Toe settings are important because they affect performance through tire wear, straight-line stability, and corner handling characteristics. Vehicles may have different toe settings depending on the impact the driver wants on directional stability. Toe-in enhances straight-line stability, while toe-out provides for quicker steering response. For example, toe-in causes the wheels to roll in intersecting paths, which results in straight-line stability as the wheels stay straight. In this setup, the wheels absorb any irregularity without changing the direction of the vehicle. In contrast, toe-out results in slight disturbances that cause the wheels to roll in directions that proscribe a turn. Thus, a toe-out vehicle may be trying to enter a turn, instead of maintaining a straight path. Typically racing cars have at least some toe-out to promote enhanced turning ability, while street cars, or basic passenger cars, use some toe-in for straight-line stability.

Camber angle is another wheel alignment metric that car racing drivers are concerned with. Camber measures the angle of a wheel relative to the road surface. It is more simply the vertical tilt of a wheel. Camber is important because it can improve tire grip and thus provide better control of the vehicle, especially during turns. The camber of the wheel may affect the steering and suspension of the vehicle. A wheel has zero or neutral camber if the wheel is perfectly perpendicular with the level ground. If the top of the wheel tilts outward from the vehicle and the bottom slopes in, the wheel has positive camber. If the top of the wheel tilts in toward the vehicle and the bottom slopes outward, the wheel has negative camber. Typically, racing cars have some negative camber, while street cars have slightly positive camber. The more tire surface area that is in contact with the road, the better grip and stability the vehicle will have. Ideally, the tread surface of a tire is flat relative to the ground. However, because streets are typically not completely level, a slightly positive camber will provide better surface contact and grip. Thus, street cars, which are tuned primarily for straight-line stability, have wheels that are typically aligned with slightly positive camber. Racing car drivers however, may desire maximum cornering control or turning control, and thus may adjust the wheels to have negative or positive camber so as to compensate for tire deflection during cornering.

Camber is typically measured using a camber gauge. The gauge is set to zero and attached to the front hub of the wheel so that it is parallel to the surface of the wheel hub. The camber is then read from the camber gauge.

Toe measurement involves a more manual process. The traditional method of toe measurement used in car racing utilizes two manual measurements per wheel. The user first measures the distance between a reference marker, such as a string positioned parallel to the chassis centerline, and the rear edge of the wheel, and then measures the distance between the reference marker and the front edge of the wheel. The distance from the rear edge of the wheel is then subtracted from the distance from the front edge of the wheel. This difference is the toe. If the difference is negative, the measurement indicates that the wheels are toe-in. If the difference is positive, the measurement indicates that the wheels are toe-out.

While the traditional car racing method is typically used to align the wheels for racing cars, there are also several different types of other methods that use various devices to measure toe. Methods to measure toe are generally divided into the following four categories: (1) manual measurement relative to parallel strings or lasers fixed to the chassis (traditional racing method); (2) mechanical or optical calculation of total toe per axle by comparing positions of wheel fixtures; (3) electronic computation of camera images to determine wheel target positions; and (4) mechanical or optical measurement of individual toe angles by comparing wheel positions to an external reference system Digital calipers may be used to manually measure toe relative to parallel strings or lasers fixed to the chassis in the traditional method. In this method, a first measurement is taken using digital calipers that are placed against the rear edge of the wheel, zeroed, and moved until it is aligned with the string or laser reference marker. The first measurement is then recorded and the digital calipers are zeroed again. A second measurement is taken using the digital calipers at the front edge of the wheel. The difference of the two measurements is the resulting toe.

While the traditional method continues to be used, the manual measurements involved in this method present several issues that make the process slow and prone to error. Two observational errors with each measurement may potentially occur—the measurement from the rear of the wheel to the reference marker and the measurement from the front of the wheel to the reference marker. Additionally, the person taking the measurement must do subtraction, which may also introduce mistakes in the value, sign or both. Even small errors in measurements can cause substantial effects in vehicle behavior due to the tire's high sensitivity to slip angle, which is the angle between the wheel's rotational plane and the direction in which it is moving. These issues make the manual process less reliable in high performance contexts such as racing car racing where the wheels frequently need aligning.

In the second method, mechanical or optical calculation of total toe per axle is calculated by comparing positions of wheel fixtures. In this method, a first device is attached to a first front wheel. A light beam is projected to a second device on the second front wheel and total toe is determined from the angle of reflection. A difference between this method and the traditional method used in car racing is that in the traditional method, individual toe relative to the chassis can be determined, while in this method only the angle between the two measured wheels is determined and the relative chassis centerline position remains undetermined.

The third method uses the electronic computation of camera images to determine wheel target positions. In one embodiment disclosed in U.S. Publication 20110179656 A1, active sensing heads with image sensors and at least one spatial relationship sensor for sensing a relationship between active sensing heads are mounted on each wheel to measure toe. Active sensing heads may include inclinometers for sensing tilt angles of the respective sensing head. This method is commonly used in street car shops. They are very accurate and can determine individual toe angles relative to the chassis centerline, but are bulky and expensive. As a result, they are not generally used by racing teams for car alignment during races.

The last method utilizes mechanical or optical measurement of individual toe angles by comparing wheel positions to an external reference system. In this method, toe is determined by measuring wheel and chassis positions relative to an external reference system. The external reference system may be a device or structure with known dimensions that is mounted to the front and back of the vehicle. In one embodiment, the external reference may be a string reference system where the string is attached to an external structure placed at the front of the vehicle so that the string is not attached to the chassis. In this method, the individual toe angles relative to the chassis can be determined through geometric calculations but are not measured directly against the chassis.

While there are various methods for measuring wheel alignment, in the racing context, a method that is reliable, accurate, and quick to perform is necessary. The method traditionally used in racing provides a quick way to check toe alignment, but an improvement is necessary in order to avoid potential errors in measurement accuracy which may be costly to performance.

SUMMARY OF THE INVENTION

The present invention relates to a wheel alignment device for measuring the toe and camber angles of a wheel of a vehicle. In one embodiment, the wheel alignment device for measuring the toe angle of a wheel of a vehicle comprises: an adjustable housing; a scale slider comprising: i) one or more measurement scales; ii) a centering marker; and iii) a positioning brake; and a toe positioning pin projecting from an end of the adjustable housing, the toe positioning pin configured to be rigidly connected to the adjustable housing during operation of the wheel alignment apparatus, wherein the scale slider is adjustable to a plurality of positions within the housing.

In one embodiment, the wheel alignment device for measuring toe includes measuring scales that comprise a positive toe region and negative toe region. Measurements resulting in the positive region indicate that the wheel is toe-out, while measurements resulting in the negative region indicate that the wheel is toe-in. In another embodiment, the wheel alignment device may contain a magnifying lens to enable precision in determining toe measurements.

In another embodiment, the wheel alignment device for measuring toe may have a second toe positioning pin on a second end of the wheel alignment device to allow the device to be placed at the edge of the wheel in a perpendicular position relative to a rotational plane of the wheel. In another embodiment, the wheel alignment device may include one or more camber positioning pins on the bottom of the wheel alignment device to allow the wheel alignment device to be mounted across the diameter of the wheel to measure camber. In another embodiment the one or more camber positioning pins may be located on the bottom of each end of the wheel alignment device.

In another embodiment, the wheel alignment device for measuring toe and camber angles of a wheel of a vehicle comprising: an adjustable housing; a scale slider comprising: i. one or more measurement scales; ii. a centering marker; and iii. a positioning brake; and a toe positioning pin projecting from an end of the adjustable housing, the toe positioning pin configured to be rigidly connected to the adjustable housing during operation of the wheel alignment apparatus; and a telescopic arm, wherein the scale slider is adjustable to a plurality of positions within the housing.

In one embodiment, the wheel alignment device for measuring toe and camber includes measuring scales that comprise a positive region and negative region. In another embodiment, the wheel alignment device may contain a magnifying lens to enable precision in determining toe measurements.

In another embodiment, the wheel alignment device for measuring toe and camber may have a second toe positioning pin on a second end of the wheel alignment device to allow the device to be placed at the edge of the wheel in a perpendicular position relative to a rotational plane of the wheel. In another embodiment, the wheel alignment device may include one or more camber positioning pins on the bottom of the wheel alignment device to allow the wheel alignment device to be mounted across the diameter of the wheel to measure camber. In another embodiment the one or more camber positioning pins may be located on the bottom of each end of the wheel alignment device.

In another embodiment the wheel alignment device for measuring toe and camber comprises a telescopic arm that allows the length of the wheel alignment device to be extended to fit a one or more wheels of different sizes. Since the wheel alignment device must be placed across the diameter of the wheel in order to measure camber, the telescopic arm allows the wheel alignment device to be adjusted to support different wheel diameters. Additionally, the wheel alignment device may include a digital angle gauge that is attached to the telescopic arm. The angle gauge may be replaced with a third party angle gauge that is attached to the telescopic arm. The angle gauge may be digital or analog.

In one embodiment, the method for measuring a toe angle of a wheel of a vehicle using a wheel alignment device comprises: placing the wheel alignment device on a rear edge portion of the outward facing surface of the wheel so that the wheel alignment device is in a perpendicular position relative to a rotational plane of the wheel and positioned between the outward facing surface of the wheel and a reference marker; moving a scale slider of the wheel alignment device to a first position so that a centering marker on the scale slider of the device aligns with the reference marker; placing the wheel alignment device on a front edge portion of the outward facing surface of the wheel so that the wheel alignment device is in a perpendicular position relative to a rotational plane of the outward facing surface of the wheel and positioned between the outward facing surface of the wheel and the reference marker; determining a toe measurement from a second position on the measurement scale where the reference marker intersects the measurement scale of the wheel alignment device at an offset from the centering marker on the measurement scale of the scale slider.

In one embodiment, the reference marker is a string that is parallel to a chassis centerline of a vehicle. In another embodiment, the reference marker comprises a laser beam.

In one embodiment, the second measurement indicates a wheel is toe-out if the displacement from the centering marker is in the positive region of the measurement scale. In another embodiment, the second measurement indicates a wheel is toe-in if the displacement from the centering marker is in the negative region of the measurement scale. In another embodiment, if the second measurement is on the centering mark of the measurement scale, then there is zero toe angle.

In one embodiment, camber is measured using the wheel alignment device by extending a telescopic camber arm of the wheel alignment apparatus to fit a diameter of the wheel; placing the wheel alignment apparatus across the diameter of a wheel using one or more camber positioning pins; determining a camber angle of the wheel by reading the angle gauge. In another embodiment, the angle gauge on the wheel alignment device may be a detachable third party angle gauge.

DETAILED DESCRIPTION OF THE INVENTION

Figure 1A:
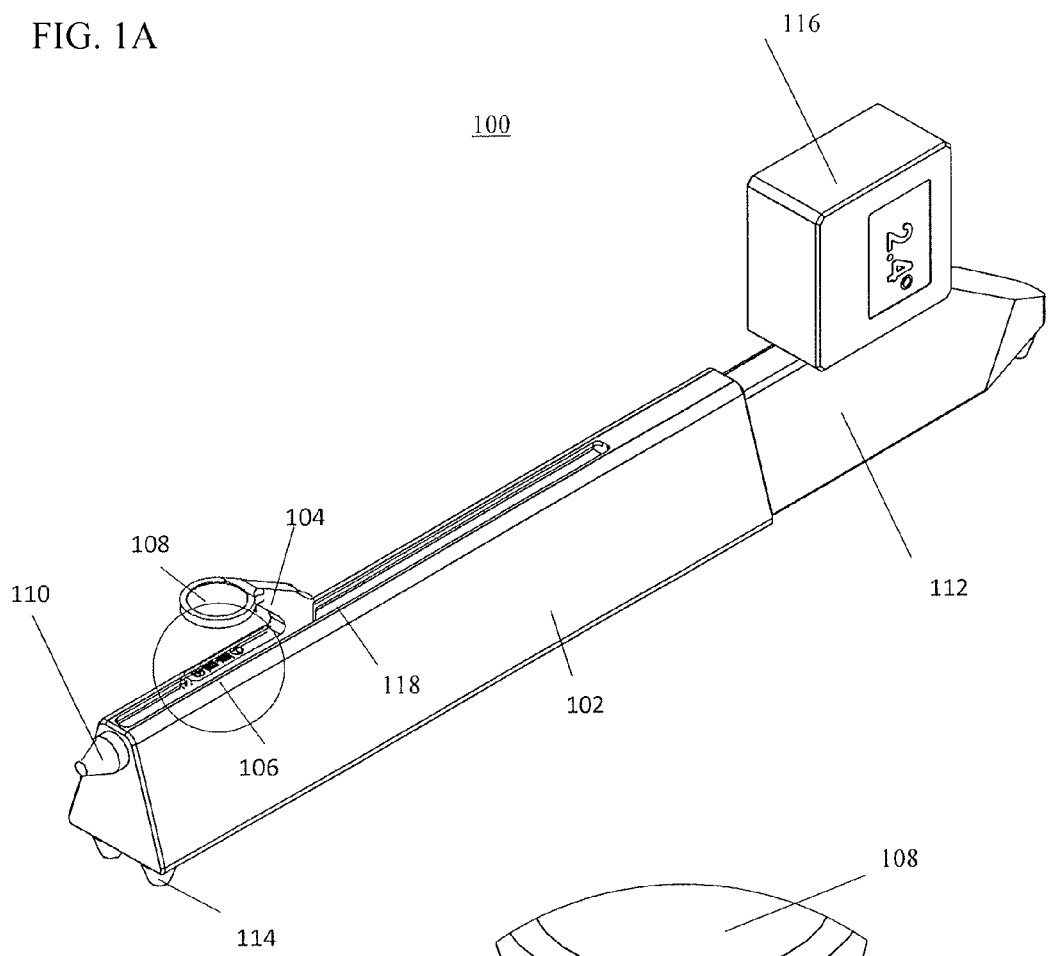
FIG. 1A is a diagram showing components of the wheel alignment device, according to some embodiments of the invention.

In the following description of the disclosure and embodiments, reference is made to the accompanying drawings in which are shown, by way of illustration, specific embodiments that can be practiced. It is to be understood that other embodiments and examples can be practiced and changes can be made without departing from the scope of the disclosure.

In addition, it is also to be understood that the singular forms "a," "an," and "the" used in the following description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units, but do not preclude the presence or addition of one or more other features, integers, steps, operations, elements, components, units, and/or groups thereof.

Described is a wheel alignment device for measuring toe angle and camber of the wheels of a vehicle. Toe angle and camber are important for wheel alignment because they can affect the performance of a racing car, as described above. The described wheel alignment devices simplify the wheel alignment measurements and increase measurement accuracy by eliminating mathematical errors and observational measurement errors that may otherwise arise. Even small errors in measurements can cause substantial effects in vehicle behavior due to the tire's high sensitivity to slip angle, which is the angle between the wheel's rotational plane and the direction in which it is moving. The wheel alignment device according to the embodiments described herein offers a more reliable tool for measuring wheel alignment in high performance contexts where the wheels of a vehicle frequently need to be aligned.

As described above, the traditional method for toe measurement in car racing utilizes two manually taken measurements per wheel. Typically, a reference system, such as a structure that supports a string that is parallel to the chassis centerline of a vehicle is used for making these measurements. The string is used as a reference marker. A user first measures the distance between the reference marker and the rear edge of the wheel, and then repeats the measurement between the reference marker and the front edge of the wheel. The difference between the two measurements is taken by subtracting the measurement at the rear edge of the wheel from the measurement at the front edge of the wheel. The difference between the two measurements indicates the toe of the wheel. If the difference is positive, the measurement indicates that the wheels are toe-in. If the difference is negative, the measurement indicates that the wheels are toe-out.

As in the traditional method for toe measurement in car racing, the methods according to certain embodiments described herein utilize a reference marker and a procedure at the rear edge of the wheel and a procedure at the front edge of the wheel. However, the wheel alignment device embodiments described herein simplify toe measurement by allowing the toe to be read directly from a measurement scale on the device during the second procedure without requiring the user to make any measurement, do any subtraction, or determine whether the result is positive for toe-out or negative for toe-in. The figures below describe certain embodiments of the wheel alignment device described herein as well as how to use these wheel alignment devices without having to do any mathematical computation. Certain embodiments also serve a dual purpose by including a telescopic arm and angle gauge for determining camber.

Toe Measurement

FIG. 1 illustrates the components of wheel alignment device 100 according to certain embodiments, which includes a main housing 102, a scale slider 104, a measuring scale 106, a magnifying glass 108, a positioning pin for toe 110, positioning pins for camber 114, a telescopic arm 112, a digital angle gauge 116, a positioning brake 118, and a centering marker 120. Device 100 may be used, according to methods described herein, to determine wheel toe angle without requiring multiple measurements and without performing calculations. Methods for determining toe using device 100 are simplified are more reliable than the traditional wheel alignment method used in car racing.

According to certain embodiments, main housing 102 includes a main body portion, a channel for scale slider 104, and a connection point for toe positioning pin 110. According to certain embodiments, main housing 102 includes connection points for additional positioning pins, such as camber positioning pins 114, and/or a receptacle for telescopic arm 112. Main housing 102 may be formed of many different materials such as wood, metal, and/or plastic. According to certain embodiments, main housing 102 is formed of a lightweight metal, such as aluminum. According to certain embodiments, main housing 102 is formed of a durable plastic such as Polyethylene (PE), Polypropylene (PP), Polystyrene (PS), Poly Vinyl Chloride (PVC), and/or Acrylonitrile Butadiene Styrene (ABS). According to certain embodiments, main housing 102 is a single solid piece, while in other embodiments, it is formed of multiple pieces. For example, main housing 102 may be formed of a metallic frame with sheet metal covering. Main housing 102 may also be formed of multiple materials. For example, main housing 102 may include a plastic body with a metallic channel to receive scale slider 104. Main housing 102 may be formed of plastic and include metal inserts at the connection points for screwing in toe positioning pin 110. According to certain embodiments, main housing 102 has a trapezoidal shape, as shown in FIG. 1A. According to certain other embodiments, main housing 102 has a rod or tube shape or a square tube shape. Main housing 102 is preferably configured to be lightweight and durable enough to withstand multiple drops and being run over by a heavy car. According to certain embodiments, main housing 102 includes an end cap at an end of the channel for capturing scale slider 104 during assembly. According to certain embodiments, main housing 102 is six inches to thirty-six inches in length and one to eight inches in height and/or width.

According to certain embodiments, a scale slider 104 is formed of metal and/or plastic, e.g., aluminum, steel, PP, PV, PS, PVC, or ABS. Scale slider 104 may be molded or machined. Measuring scale 106 may be etched or printed on scale slider 104, may be a sticker that is glued on, or may be molded or machined into scale slider 104. Measuring scale 106 includes multiple hash marks or indicators at fixed measurement intervals. According to certain embodiments, measuring scale 106 includes hash marks at intervals according to metric, English, or both units (e.g., at intervals of one millimeter, one centimeter, fractions of centimeters, or fractions of inches). According to certain embodiments, measuring scale 106 includes hash marks correlated to angle measurements based on a predetermined wheel diameter. According to certain embodiments, multiple sets of angle measurements are included for multiple standard wheel sizes. According to certain embodiments, numbers are printed on scale slider 104 in addition to the hash marks. Scale slider 104 may include centering marker 120, which may be a hash mark or a dot. Alternatively, centering marker 120 may consist of two hash marks that are at a distance apart from each other equal to the width of a reference string. In this way, scale slider 104 is "zeroed" by adjusting the position of scale slider 104, according to the methods described below, such that the reference string is in between these two has marks. According to certain embodiments, scale slider 104 includes a digital screen that may be programmed to show various scales.

According to certain embodiments, scale slider 104 includes magnifying glass 108, which enables a user to better see measuring scale 106. According to certain embodiments, magnifying glass 108 may be optimized by assuming that a user's eye is a standard distance from measuring scale 106. For example, a user's eye may be around twelve inches from measuring scale 106 and magnifying glass 108 is designed such that measuring scale 106 is in focus from an observation point of twelve inches. According to certain embodiments, the focus of magnifying glass 108 is user adjustable. According to certain embodiments, scale slider 104 incorporates a positioning brake 118 for retaining scale slider 104 at a fixed position within the channel in main housing 102. For example, a screw may be incorporated into scale slider 104 that, when tightened, applies force against the bottom of the channel in which scale slider 104 rides forcing scale slider 104 against the upper lip of the channel. The frictional force created holds scale slide 104 in place. According to other embodiments, a quick release positioning brake is used such as a linkage or cam that enables a user to quickly and simply press down on a lever to lock the scale slider 104 in place. According to certain embodiments, positioning brake 118 is a separate piece within the channel. According to certain embodiments, scale slider 104 and the channel in main housing 102 are designed with an interference fit such that scale slider 104 remains in place unless sufficient force is applied. In this way, positioning brake 118 is not required to ensure that scale slider 104 remains in position.

According to certain embodiments, wheel alignment device 100 includes toe positioning pin 110. Toe positioning pin 110 may be a part of the same piece as main housing 102. For example, where main housing 102 is a tube or a rod, toe positioning pin 110 may be a tapered end of the tube or rod. According to certain embodiments, toe positioning pin 110 is a separate piece that is affixed to main housing 102. For example, toe positioning pin 110 may be welded or soldered onto main housing 102 or may be bolted on main housing 102. In some embodiments, toe positioning pin 110 is pressed into main housing 102. According to certain embodiments, toe positioning pin 110 tapers toward a smaller diameter at the distal end such that the toe positioning pin 110 fits comfortably on the outward facing surface of the rim of the wheel. According to certain embodiments, the distal end of toe positioning pin 110 is designed such that the surface that is positioned against the wheel is along or close to an imaginary line running parallel to the centerline of wheel alignment device 100 that intersects scale slider 104. In this way measurement errors introduced from mis-positioning of wheel alignment device 100 may be reduced. In other words, when wheel alignment device 100 is positioned against the wheel, the contact point between toe positioning pin 110 and the wheel is near or on a horizontal plane that intersects centering marker 120, which facilitates the positioning of wheel alignment device 100 perpendicularly to the wheel. According to certain embodiments, the distal end of toe positioning pin 110 is designed such that the surface that is positioned against the wheel facilitates perpendicular positioning of wheel alignment device 100 relative to the wheel. For example, the surface is formed to mate with a flat portion of the wheel's rim or to have the same profile as the wheel's rim.

Toe positioning pin 110 may be formed of various materials such as metal, plastic, or rubber. The use of plastic or rubber may reduce scratching or other damage to the rim of a wheel during use. Toe positioning pin 110 is preferably formed of a material that exhibits low deformation in the axial direction during use to reduce potential measurement error. For example, where toe positioning pin is formed of rubber, hardened rubber may be used in order to reduce compression when it is placed against a wheel. According to certain embodiments, toe positioning pin 110 is formed of metal or plastic with a plastic or rubber cap that interfaces with the wheel rim during use.

According to certain embodiments, wheel alignment device 100 includes a level indicator to assist a user in positioning wheel alignment device 100 horizontally during use. Horizontal positioning is important in maintaining wheel alignment device as perpendicular as possible to the wheel. This helps ensure that the distance between the wheel and the reference marker (e.g., reference string) is accurately captured by wheel alignment device 100 during use.

Figure 2A:
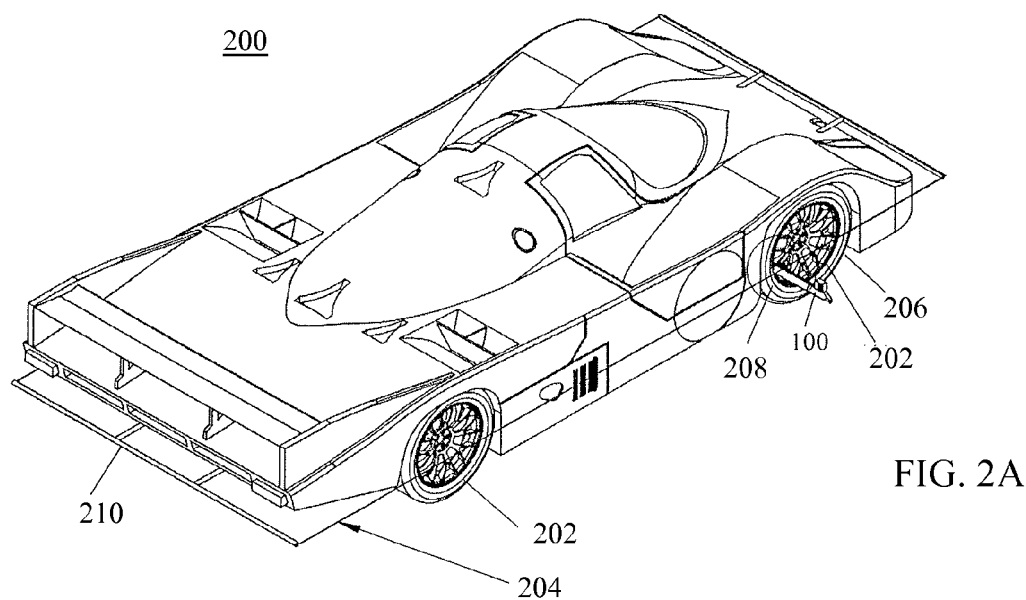
FIG. 2A is a diagram of a racing car using the wheel alignment device and using a reference system that utilizes a string as a reference marker, according to some embodiments of the invention.
Figure 2B:
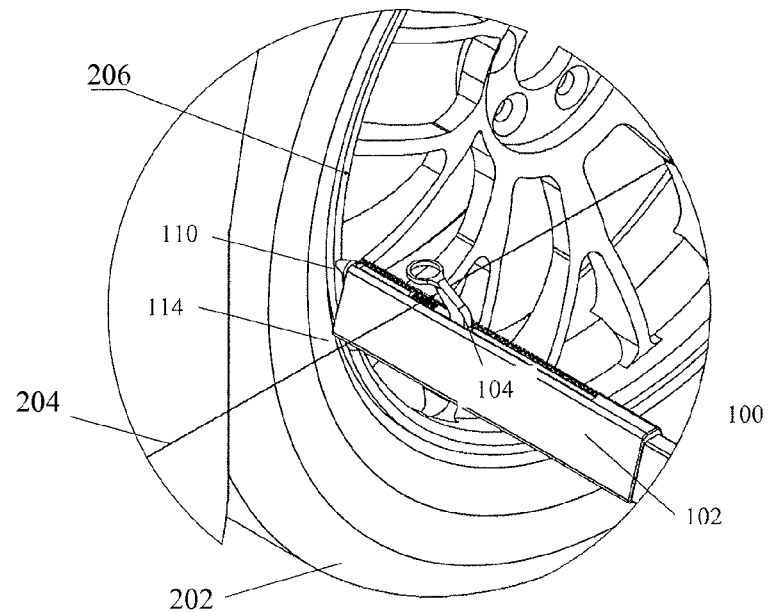
FIG. 2B is a diagram showing a detailed view of the wheel alignment device using a reference string as a reference marker, according to some embodiments of the invention.
Figure 3A:
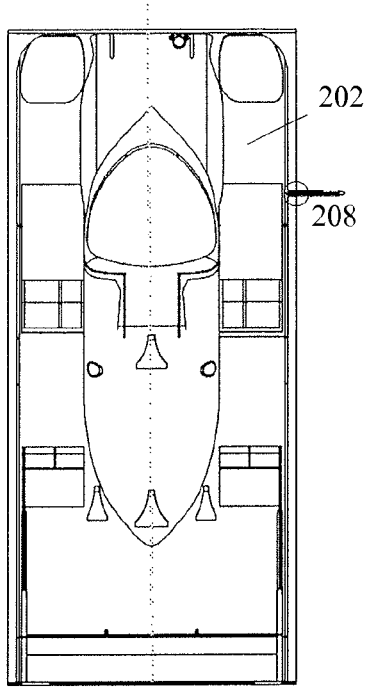
FIG. 3A is a diagram showing an overhead view of a racing car with a chassis centerline and the wheel alignment device mounted on the rear edge of the wheel, where a first measurement is taken, according to some embodiments of the invention.
Figure 3B:
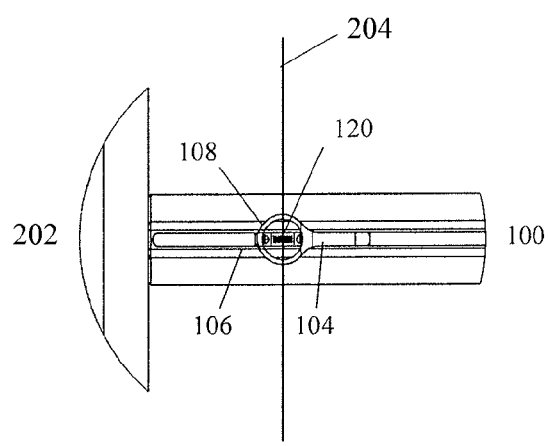
FIG. 3B is a diagram showing a detailed view of the wheel alignment device mounted on a wheel where the centering marker of the wheel alignment device is aligned with a parallel string at the rear edge of wheel, according to some embodiments of the invention.

FIGS. 2A and 2B illustrate a method according to certain embodiments for using wheel alignment device 100 to take a toe measurement. Measurements are taken relative to a reference marker 204 in reference system 210, such as a string that is attached to vehicle 200 so that it is parallel to the chassis centerline 302 of vehicle 200 as shown in FIG. 2A, FIG. 3A and FIG. 3B. In one embodiment, the reference system 210 may consist of nylon lines directly attached to the chassis and positioned parallel to the central vertical plane of the chassis of a vehicle in an arrangement that allows the lines to be close to the outside of the wheel/tire assemblies. In FIG. 2A reference string 204 is used as the reference marker. In one embodiment, a laser reference system may be used where laser beams are projected parallel to the chassis centerline 302 (e.g., by mounting to the chassis) and used as a reference marker 204 for taking measurements. In another embodiment, the reference system 210 may comprise external structures that are mounted on the front and the back of the vehicle and are used as reference markers for determining toe.

Figure 4A:
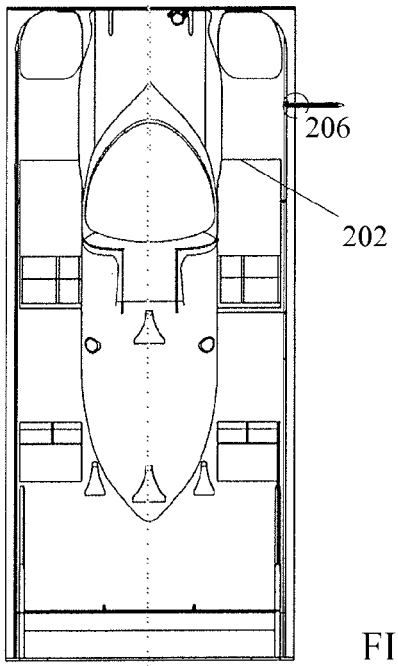
FIG. 4A is a diagram showing an overhead view of a racing car with a chassis centerline and the wheel alignment device mounted on the front edge of the wheel, where a second measurement is taken, according to some embodiments of the invention.

To measure toe according to certain embodiments, wheel alignment device 100 is placed at two positions of the wheel 202 as indicated in FIG. 2A—one at the rear edge portion 208 of the outward facing surface the wheel as shown in FIG. 3A and one at the front edge portion 206 of the outward facing surface of the wheel using the wheel alignment device 100 as shown in FIG. 4A. Reference marker 204, which may be a string attached to the vehicle so that it is parallel to the chassis centerline 302 of the vehicle, is used as a reference marker. Wheel alignment device 100 is placed on the rear edge portion 208 of the outward facing surface of the wheel so that the toe positioning pin 110 is placed on the rim of the wheel near the rear edge portion 206 of the outward facing surface of the wheel 202 as shown in FIG. 2B. The toe positioning pin 110 projects from an end of the adjustable housing and is configured to be rigidly connected to the adjustable housing during the operation of the wheel alignment apparatus. According to certain embodiments, toe positioning pin 110 cannot be rotated around main housing 102. In other words, toe positioning pin 110 is fixed relative to main housing 102 such that it does not move relative to main housing 102 during use. The scale slider 104 is moved away from or toward the wheel 202 and toward the string reference marker 204 until the string reference marker 204 aligns with the centering marker 120 on the wheel alignment device 100 when viewed from the top as shown in FIG. 3B. Magnifying lens 108 on the scale slider 104 may be used to precisely align the centering marker 120 so that the intersecting string 204 is directly over zero on the measurement scale 106 where the centering marker 120 denotes. Once the centering marker 120 has been aligned to the position of the reference marker 204, the positioning brake 118 on the scale slider 104 is locked to keep the scale slider 104 in the newly determined zeroed position. The wheel alignment device 100 is then removed from the rear edge portion 208 of the outward facing surface of the wheel 202 and moved to the front edge portion 206 of the outward facing surface of the wheel 202. At this point, the scale slider 104 has been calibrated to the zeroed position.

Figure 1B:
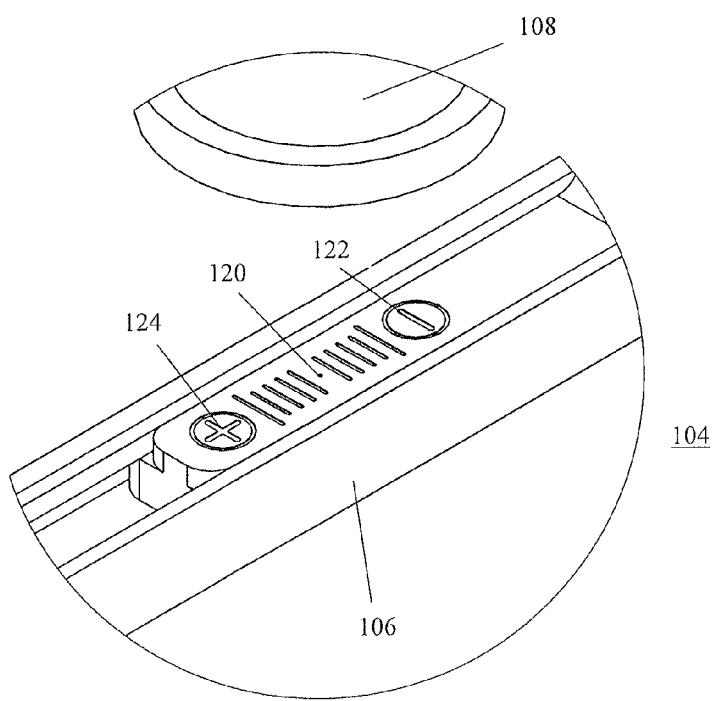
FIG. 1B is a diagram showing a detailed view of the measuring scale on the wheel alignment device, according to some embodiments of the invention.
Figure 4B:
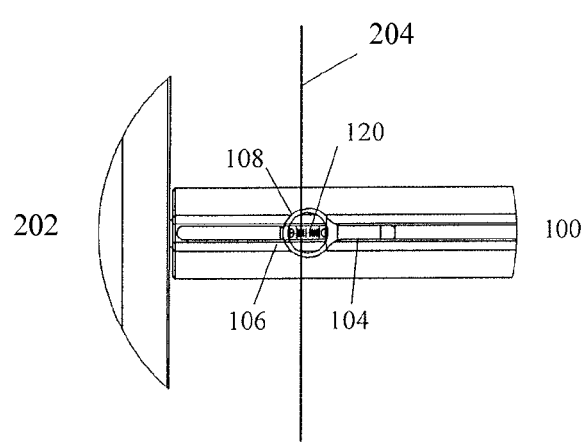
FIG. 4B is a diagram showing a detailed view of the wheel alignment device mounted on a wheel where the centering marker of the wheel alignment device is aligned with a parallel string at the front edge of wheel, according to some embodiments of the invention.
Figure 5:
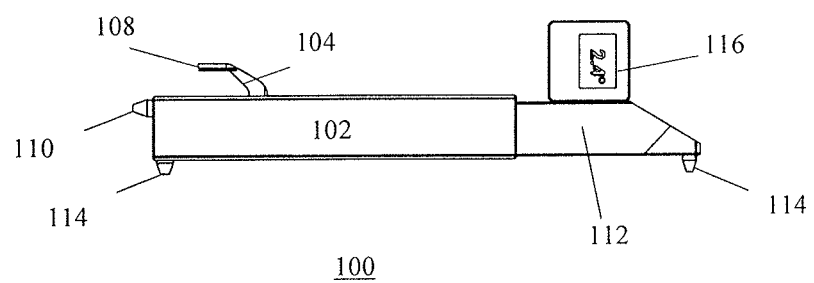
FIG. 5 is a diagram of the wheel alignment device where the telescopic arm is not extended and the measuring scale is in a first position, according to some embodiments of the invention.

A measurement is taken at the front edge portion 206 of the outward facing surface of the wheel 202 as shown in FIG. 4A. The wheel alignment device 100 has been placed at the front edge portion 206 of the outward facing surface of the wheel 202 with the scale slider 104 locked in the position from the first measurement, as described above. Using the prior locked position as the starting point, a second position on measurement scale 106 where the reference marker or string 204 intersects the measurement scale 106 is recorded as shown in FIG. 4B. This second measurement is the toe angle of the wheel 202. It measures the angle of deviation in terms of a displacement between the front and the rear of the wheel relative to the chassis centerline 302. The toe or amount of displacement from the front edge portion 206 of the outward facing surface of the wheel 202 to the reference marker in 204 is directly read from the measurement scale 106 as shown in FIG. 4B. As shown in FIG. 1B, a displacement where the offset is in the positive region 124 of the measurement scale 106 indicates the wheel is toe-out, whereas a displacement where the offset is in the negative region 122 of the measurement scale 106 indicates the wheel 202 is toe-in. In one embodiment as shown in FIG. 4B, the reference marker 204 intersects the measurement scale 106 in the positive region 124 of the measurement scale 106 relative to the centering marker 120 at position 0. This indicates the wheel is toe-out as the front of the wheel is pointed out toward the reference marker and the back of the wheel is directed inward toward the vehicle. In another embodiment, if the reference marker 204 intersects the measurement scale 106 in the negative region 122 of the measurement scale 106, then wheel is toe-in. This indicates that the front of the wheel is directed inward toward the vehicle 200 and the back of the wheel is directed outward toward the reference marker 204.

In one embodiment, the wheel alignment device may include a toe positioning pin 110 on only one end of the wheel alignment device. In another embodiment, the wheel alignment device may include a toe positioning pin on either end of the wheel alignment device with a corresponding second scale slider 104. This second set of measuring features may accommodate a different size car, wheel, or alternate setup. The toe positioning pins may be unscrewed and replaced with different sized pins to provide a better fit for different types and sizes of wheels, tires, and rims.

Camber Measurement

According to certain embodiments, a wheel alignment device also provides for measuring camber. Camber measures the vertical tilt of the wheel relative to the vertical axis of the wheel. A wheel has zero or neutral camber if it is perfectly perpendicular with the level ground. If the top of the wheel tilts outward from the vehicle, the wheel has positive camber, whereas if the top of the wheel tilts in toward the vehicle, the wheel has negative camber. Camber is typically measured by using a camber gauge. The gauge is set to zero and attached to the front hub of the wheel so it is parallel to the surface of the wheel hub. The camber is then read from the camber gauge.

FIGS. 5, 6, 7A, and 7B illustrate embodiments of wheel alignment device 100 with integrated camber measurement. The camber measurement features include telescopic arm 112, camber positioning pins 114, and angle gauge 116. According to certain embodiments, telescopic arm 112 slides in and out of main housing 102. According to certain embodiments, telescopic arm 112 includes a connection point for camber positioning pins 114 and a connection portion for affixing angle gauge 114. According to certain embodiments, main housing 102 includes connection points for camber positioning pins 114. Telescopic arm 112 may be formed of many different materials such as wood, metal, and/or plastic. According to certain embodiments, telescopic arm 112 is formed of a lightweight metal, such as aluminum. According to certain embodiments, telescopic arm 112 is formed of a durable plastic such as PE, PP, PS, PVC, and/or ABS. According to certain embodiments, telescopic arm 112 is a single solid piece, while in other embodiments, it is formed of multiple pieces. For example, telescopic arm 112 may be formed of a metallic frame with sheet metal covering. Telescopic arm 112 may also be formed of multiple materials. For example, telescopic arm 112 may include a plastic body with a metallic portions designed to act as a bearing surface for sliding in main housing 102. Telescopic arm 112 may be formed of plastic and include metal inserts at the connection points for screwing in camber positioning pins 114. According to certain embodiments, telescopic arm 112 has a trapezoidal shape, as shown in FIG. 1A. According to certain other embodiments, telescopic arm 112 has a rod or tube shape or a square tube shape. According to certain embodiments, telescopic arm 112 and main housing 102 incorporate one or more linear bearings to facilitate sliding. Additionally or alternative, one or more linear seals are incorporated into telescopic arm 112 and main housing 102 to prevent contaminants from enter into the inner portions of certain embodiments of wheel alignment device 100. According to certain embodiments, these seals act as linear bearings facilitating telescopic movement. According to certain embodiments, seals create sufficient friction such that wheel alignment device remains in whatever extended position a user places it in during use. In some embodiments, a separate locking device is incorporated that locks telescopic arm 112 relative to main housing 102 during use.

According to certain embodiments, telescopic arm 112 is six inches to thirty-six inches in length and two to eight inches in height and/or width.

According to certain embodiments, wheel alignment device 100 includes camber positioning pins 114. Camber positioning pins 114 may be a part of the same piece as main housing 102 and/or telescopic arm 112. For example, where main housing 102 or telescopic arm 112 is a tube or a rod, camber positioning pin 114 may be a tapered end of the tube or rod. According to certain embodiments, camber positioning pin 114 is a separate piece that is affixed to main housing 102 and/or telescopic arm 112. For example, camber positioning pin 114 may be welded or soldered onto main housing 102 and/or telescopic arm 112 or may be bolted on main housing 102 and/or telescopic arm 112. In some embodiments, camber positioning pin 114 is pressed into main housing 102. According to certain embodiments, camber positioning pin 114 tapers toward a smaller diameter at the distal end such that the camber positioning pin 114 fits comfortably on the outward facing surface of the rim of the wheel. According to certain embodiments, the distal end of camber positioning pins 114 are all on a plane that is parallel to the measurement plane of angle gauge 116. According to certain embodiments, the distal end of camber positioning pin 114 is designed such that the surface that is positioned against the wheel facilitates positioning of wheel alignment device 100 on the wheel. For example, the surface is formed to mate with a flat portion of the wheel's rim or to have the same profile as the wheel's rim.

Camber positioning pin 114 may be formed of various materials such as metal, plastic, or rubber. The use of plastic or rubber may reduce scratching or other damage to the rim of a wheel during use. Camber positioning pin 114 is preferably formed of a material that exhibits low deformation in the axial direction during use to reduce potential measurement error. For example, where toe positioning pin is formed of rubber, hardened rubber may be used in order to reduce compression when it is placed against a wheel. According to certain embodiments, camber positioning pin 114 is formed of metal or plastic with a plastic or rubber cap that interfaces with the wheel rim during use.

According to certain embodiments, wheel alignment device 100 includes a digital angle gauge 116. For example, digital angle gauge 116 may be a CMT DEG-001 Digital Angle Gauge. Digital Angle gauge 116 may be soldered, bolted, welded, glued or otherwise permanently affixed to main housing 102 or telescopic arm 112. According to certain embodiments, digital angle gauge 116 includes a magnetic mating surface and is affixed to a metal surface of main housing 102 and/or telescopic arm 112. According to some embodiments, an analog angle gauge is used instead of or in addition to digital angle gauge 116.

According to certain embodiments, wheel alignment device 100 with camber measurement functionality is designed to fit on the rim of a standard size wheel (i.e., the distance between camber positioning pins 114 on opposite ends of wheel alignment device 100 is adjustable to the diameter of a wheel rim), e.g., a standard size racing wheel such as 13 inches, and may collapse and expand to accommodate other size wheels. According to certain embodiments, alignment device 100 is designed to collapse to less than 24 inches, less than 18 inches, or less than 13 inches. According to certain embodiments, wheel alignment device 100 is includes a tiered telescopic arm 112 such that it can collapse expand past twice the length of main housing 102. In other words, telescopic arm 112 may consist of multiple sections of differing diameters that fit within each other. For example, according to certain embodiments wheel alignment device 100 may include a main housing 102 that is 6 inches in length and telescopic arm 112 that includes three sections, each of 6 inches in length, such that in its fully extended position, wheel alignment device 100 is over 18 inches in length and in its fully collapsed position, it is less than 9 inches in length. According to certain embodiments, alignment device 100 can expand to over 24 inches.

Figure 6:
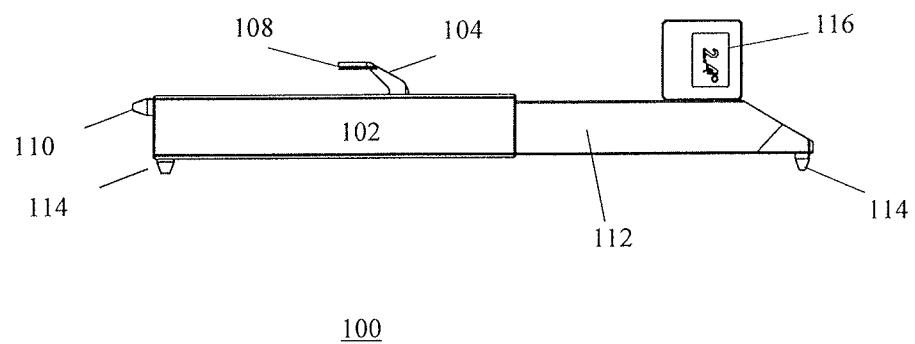
FIG. 6 is a diagram of the wheel alignment device where the telescopic arm is extended and the measuring scale is in a second position, according to some embodiments of the invention.
Figure 7A:
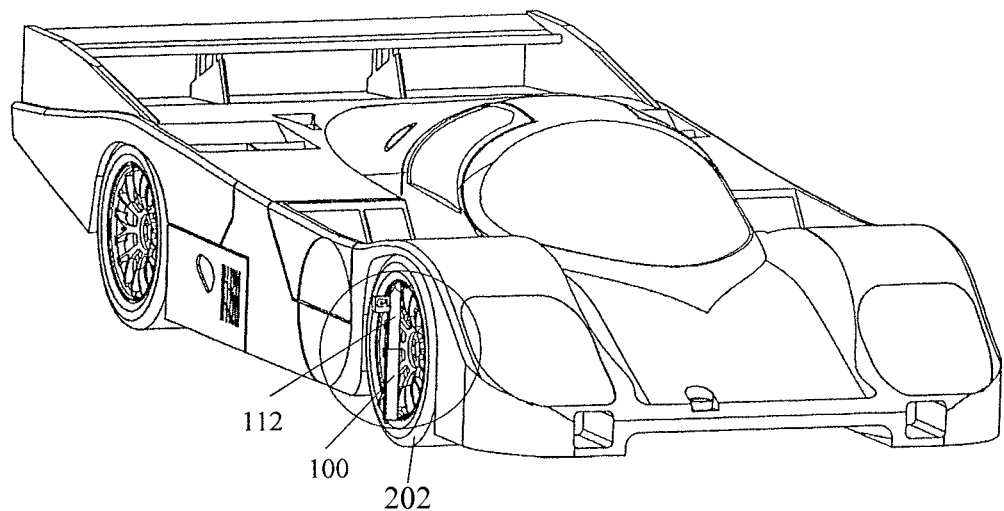
FIG. 7A is a diagram showing a racing car using the wheel alignment device to measure the camber of the wheel, according to some embodiments of the invention.
Figure 7B:
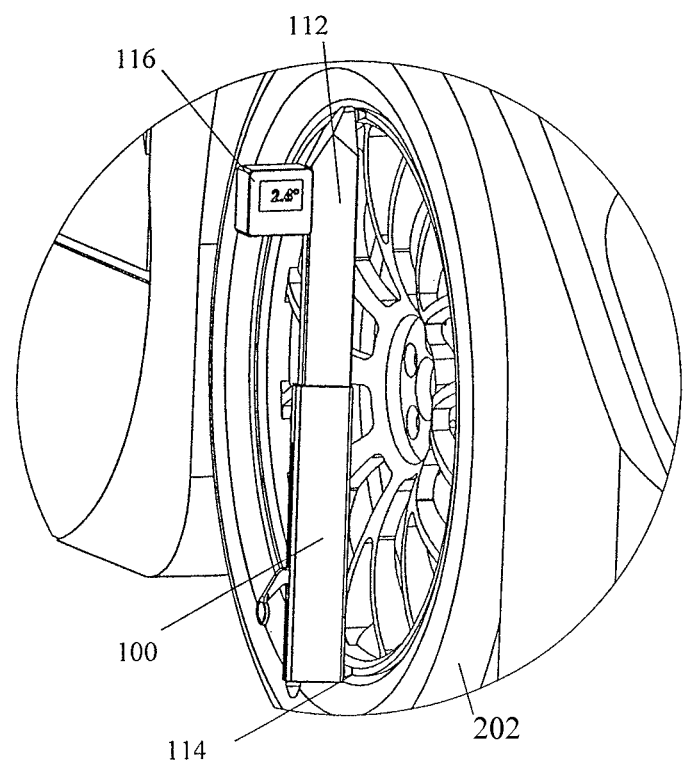
FIG. 7B is a diagram showing a detailed view of the wheel alignment device where the telescopic arm is extended to fit the diameter of the wheel and an angle gauge is used to read the suspension camber angle, according to some embodiments of the invention.

In one embodiment as shown in FIGS. 7A and 7B, the wheel alignment device 100 is used to measure camber in addition to toe by extending the telescopic arm 112 of the wheel alignment device and placing the wheel alignment device parallel to the surface of the rim of the wheel so that it stretches across the diameter of the wheel. In order to place the wheel alignment device in this position, the telescopic arm 112 of the wheel alignment device is extended to lengthen the wheel alignment device so that it can be mounted across the diameter of the wheel. FIG. 6 shows an embodiment of the wheel alignment device with the telescope arm 112 extending from the wheel alignment device 100. As shown in FIG. 7B, camber positioning pins 114 may be used to hold the wheel alignment device 100 in place. The camber positioning pins may be located on the bottom on either or both ends of the wheel alignment device 100. The camber positioning pins 114 may be unscrewed and replaced with different sized positioning pins to allow for a better fit with different types and sizes of wheels, tires, and rims. Once the wheel alignment device 100 is properly mounted, the camber angle can be read from digital angle gauge 116.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

The invention claimed is:

1. A wheel alignment apparatus for measuring toe angle of a wheel of a vehicle comprising:
   a main body;
   a scale slider disposed on the main body and comprising:
      i. one or more measurement scales; and
      ii. a centering marker; and
   a toe positioning pin projecting from an end of the main body and aligned with the scale slider,
   wherein the scale slider is configured to slide along a plane that extends horizontally when the wheel alignment apparatus is in a position for measuring the toe angle and the scale slider is adjustable to a plurality of positions.

2. The wheel alignment apparatus of claim 1, wherein the one or more measurement scales comprise a positive region and a negative region.

3. The wheel alignment apparatus of claim 1, wherein the slider comprises a magnifying lens.

4. The wheel alignment apparatus of claim 1, comprising a second toe positioning pin on a second end of the wheel alignment apparatus.

5. The wheel alignment apparatus of claim 1, comprising one or more camber positioning pins on the bottom of the wheel alignment apparatus.

6. The wheel alignment apparatus of claim 1, comprising one or more camber positioning pins on the bottom of each end of the wheel alignment apparatus.

7. The wheel alignment apparatus of claim 1, wherein when the wheel alignment apparatus is in the position for measuring the toe angle, a plane that bisects the toe positioning pin and the scale slider extends vertically.

8. A wheel alignment apparatus for measuring toe and camber angles of a wheel of a vehicle comprising:
   a main body comprising a first end and a second end;
   a scale slider that slides on a first side of the main body from the first end toward the second end, the scale slider comprising:
      i. one or more measurement scales; and
      ii. a centering marker; and
   a toe positioning pin projecting from the first end of the main body; and
   first and second camber positioning pins for positioning against a wheel to measure camber angle, the camber positioning pins extending from a second side of the main body that extends between the first and second ends, the first camber positioning pin being proximate the first end and the second camber positioning pin being proximate the second end,
   wherein the scale slider is adjustable to a plurality of positions.

9. The wheel alignment apparatus of claim 8, wherein the one or more measurement scales comprise a positive region and a negative region.

10. The wheel alignment apparatus of claim 8, wherein the slider comprises a magnifying lens.

11. The wheel alignment apparatus of claim 8, comprising a second toe positioning pin on a second end of the wheel alignment apparatus.

12. The wheel alignment apparatus of claim 8, wherein the main body is adjustable to fit the diameter of a plurality of different sized wheels.

13. The wheel alignment apparatus of claim 12, wherein the main body adjusts telescopically.

14. The wheel alignment apparatus of claim 8, wherein an angle gauge is attached to the main body.

15. The wheel alignment apparatus of claim 14, wherein the angle gauge is detachable.

16. The wheel alignment apparatus of claim 8, wherein the scale slider is configured to slide along a plane that extends horizontally when the wheel alignment apparatus is in a position for measuring toe angle.

17. A method for measuring a toe angle of a wheel of a vehicle using a wheel alignment apparatus comprising:
   placing the wheel alignment apparatus on a rear edge portion of an outward facing surface of the wheel so that the wheel alignment apparatus is in a perpendicular position relative to a rotational plane of the wheel and positioned between the outward facing surface of the wheel and a reference marker;
   moving a scale slider of the wheel alignment apparatus to a first position so that a centering marker on the scale slider of the apparatus aligns with the reference marker;
   placing the wheel alignment apparatus on a front edge portion of the outward facing surface of the wheel so that the wheel alignment apparatus is in a perpendicular position relative to a rotational plane of a wheel and positioned between the outward facing surface of the wheel and the reference marker; and determining a toe measurement from a second position on the measuring scale where the reference marker intersects the measurement scale of the wheel alignment apparatus at an offset from the centering marker on the measurement scale of the scale slider.

18. The method of claim 17, wherein the reference marker comprises a string that is parallel to a chassis centerline of a vehicle.

19. The method of claim 17, wherein the reference marker comprises a laser beam.

20. The method of claim 17, wherein the second position in the negative region of the measurement scale indicates a wheel is toe-in.

21. The method of claim 17, wherein the second position in the positive region of the measurement scale indicates a wheel is toe-out.

22. The method of claim 17, wherein the second position on the centering mark of the measurement scale indicates zero toe angle.

23. The method of claim 17 further comprising measuring camber using the wheel alignment apparatus, wherein measuring camber comprises:

extending a telescopic camber arm of the wheel alignment apparatus to fit a diameter of the wheel;

placing the wheel alignment apparatus across the diameter of a wheel using one or more camber positioning pins; and determining a camber angle of the wheel by reading the angle gauge.

* * * * *